(12) United States Patent
Arnold et al.

(10) Patent No.: US 6,802,331 B2
(45) Date of Patent: Oct. 12, 2004

(54) PARTICLE-BASED CHECK VALVE

(75) Inventors: Don W. Arnold, Livermore, CA (US); David J. Rakestraw, Livermore, CA (US); Jason Rehm, Alameda, CA (US)

(73) Assignee: Eksigent Technologies LLC, Livermore, CA (US)

(*) Notice: Subject to any disclaimer, the term of this patent is extended or adjusted under 35 U.S.C. 154(b) by 0 days.

(21) Appl. No.: 10/112,718

(22) Filed: Mar. 28, 2002

(65) Prior Publication Data

US 2003/0183278 A1 Oct. 2, 2003

(51) Int. Cl.[7] .............................................. F16K 15/00
(52) U.S. Cl. ................................ 137/15.19; 137/512.1; 137/533.11
(58) Field of Search ............................ 137/15.18, 15.19, 137/315.33, 512.1, 533, 533.11, 599.01, 601.13, 601.2; 210/136, 198.2, 661

(56) References Cited

U.S. PATENT DOCUMENTS

| | | | |
|---|---|---|---|
| 3,828,729 A | * | 8/1974 | Goodridge .................. 118/634 |
| 4,023,591 A | * | 5/1977 | Short et al. .................. 137/533 |
| 4,187,874 A | * | 2/1980 | Essebaggers ........... 137/533.11 |
| 4,605,395 A | * | 8/1986 | Rose et al. ..................... 604/9 |
| 4,875,059 A | * | 10/1989 | Masuda ........................ 347/93 |
| 5,997,746 A | * | 12/1999 | Valaskovic .................. 210/656 |
| 6,444,150 B1 | * | 9/2002 | Arnold .......................... 264/69 |
| 6,610,546 B1 | * | 8/2003 | Liu et al. ..................... 436/161 |

OTHER PUBLICATIONS

J.M. Ramsey and A. van den Berg (eds), Micro Total Analysis Systems 2001, pp. 227–229, J. E. Rehm, T. J. Shepodd, E. F. Hasselbrink, Mobile Flow Control Elements for High–Pressure Micro–Analytical Systems Fabricated Using In–Situ Polymerization.

J. Vac. Sci. Technol. B 19(2), Mar./Apr. 2001, American Vacuum Society, pp. 596–599; William C. Jackson, Hy D. Tran, Michael J. O'Brien, Emmanuil Rabinovich, and Gabriel P. Lopez, Rapid Prototyping of Active Microfluidic Components Based on Magnetically Modified Elastomeric Materials.

www.sciencemag.org, Science, vol. 288, Apr. 7, 2000, Marc A. Unger, Hou–Pu Chou, Todd Thorsen, Axel Scherer, Stephen R. Quake, Monolithic Microfabricated Valves and Pumps by Multilayer Soft Lithography.

(List continued on next page.)

*Primary Examiner*—Ramesh Krishnamurthy
(74) *Attorney, Agent, or Firm*—Sheldon & Mak PC; Jeffrey G. Sheldon; Kristin C. Hiibner (57) ABSTRACT

A check valve for a fluidic system includes a fluidic conduit having an inlet with a first particle barrier, an outlet with a second particle barrier and a fluid chamber between the inlet and the outlet; and at least one particle disposed in the fluid chamber, the particle or particles aggregating at the first particle barrier to form a first hydrodynamic resistance when a first fluid pressure at the inlet is less than a second fluid pressure at the outlet, the particle or particles aggregating at the second particle barrier to form a second hydrodynamic resistance when the first fluid pressure is greater than the second fluid pressure.

25 Claims, 4 Drawing Sheets

OTHER PUBLICATIONS

PNAS, David J. Beebe, Jeffrey S. Moore, Qing Yu, Robin H. Liu, Mary L. Kraft, Byung–Ho Jo, and Chelladural Devadoss, Dec. 5, 2000, vol. 97, No. 25, pp. 13488–13493, Microfluidic Tectonics: A Comprehensive Construction Platform for Microfluidic Systems.

Analytical Chemistry, vol. 72, No. 6, Mar. 15, 2000, pp. 1144–1147, Kiichi Sato, Manabu Tokeshi, Tamao Odake, Hiroko Kimura, Takeshi Ooi, Masayuki Nakao, and Takehiko Kitamori, Integration of an Immunosorbent Assay System: Analysis of Secretory Human Immunoglobulin A on Polystyrene Beads in a Microchip.

A. van den Berg et al. (eds). Micro Total Analysis Systems 2000, pp. 11–14, Richard D. Oleschuk, Abebaw B. Jemere, Loranelle L. Shutz–Lockyear, Festus Fajuyigbe and D. Jed Harrison, Utilization of Bead Based Reagents in Microfluidic Systems.

IOP Publishing, 1994, pp., 157–171, Shuchi Shoji and Masayoshi Esashi, Microflow Devices and Systems.

* cited by examiner

PARTICLE-BASED CHECK VALVE

BACKGROUND OF INVENTION

The invention relates generally to valves used in fluidic systems, and more specifically to a passive fluid-flow check valve used in such systems.

Passive macroscale check valves are well known in the art to provide fluid flow control based upon a direction of fluid flow in the system. Check valves typically use a ball, poppet, flexible flap or elastic membrane that will seat or block an orifice to stop flow in one direction through the orifice, typically in a 'reverse' direction. When pressure is applied to direct flow in an opposite direction, the 'forward' direction, the object obstructing the orifice is displaced and relatively free flow ensues. Cracking pressure refers to the pressure differential necessary to resume flow in the forward direction by reopening the valve. Check valves have various figures of merit to measure and define the effectiveness of the valve.

There are a very limited number of valves (passive or active) that are available to work in microfluidic systems. The present invention is well suited for microfluidics, but is not limited to, microscale systems. Those existing valves for microfluidics are typically designed for gas-phase check valve operation and are generally limited to operating pressures below 100 psi. Typical reverse leak rates for passive microscale check valves are on the order of a few microliters per minute with ratios of forward/reverse flow rates up to $10^3$–$10^4$. Further, most passive microscale valves require significant micromachining and are complex. Most require component assembly and are ill-suited for integration in microfluidic systems having many other components. Many prior art microvalves are constructed in silicon, making them incompatible for many applications.

SUMMARY OF THE INVENTION

The present invention provides a simple valve structure that may be incorporated into a wide range of materials and may be close coupled in microfluidic systems. The preferred embodiment of the present invention provides for a movement of a single particle or a bed of particles to different regions of a valve to present different hydrodynamic resistances, which provide a differential flow resistance.

In one preferred embodiment, a check valve for a fluidic system includes a fluidic conduit having an inlet with a first particle barrier, an outlet with a second particle barrier and a fluid chamber between the inlet and the outlet; and at least one particle disposed in the fluid chamber, the particle(s) aggregating at the first particle barrier to form a first hydrodynamic resistance when a first fluid pressure at the inlet is less than a second fluid pressure at the outlet, the particle(s) aggregating at the second particle barrier to form a second hydrodynamic resistance when the first fluid pressure is greater than the second fluid pressure.

It is another preferred embodiment to provide a method of operating a check valve in a fluidic system. The method includes the steps of aggregating at least one particle disposed in a fluidic conduit at a first particle barrier at an inlet to form a first hydrodynamic resistance in response to a positive pressure differential between an outlet of the fluidic conduit and the inlet to substantially inhibit fluid flow out of the conduit through the inlet; and aggregating the particle(s) at a second particle barrier at the outlet to form a second hydrodynamic resistance in response to a positive pressure differential between the inlet and the outlet to substantially not interfere with fluid flow out of the conduit through the outlet.

The particles may be of varying shapes, sizes and compositions that may facilitate the fabrication and modify the performance of the valve.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

The preferred embodiments of this invention, illustrating all their features, will now be discussed in detail. These embodiments depict the novel and nonobvious check valve apparatus of this invention shown in the accompanying drawings, which are included for illustrative purposes only. These drawings include the following figures, with like numerals indicating like parts.

DETAILED DESCRIPTION OF THE INVENTION

Figure 1:
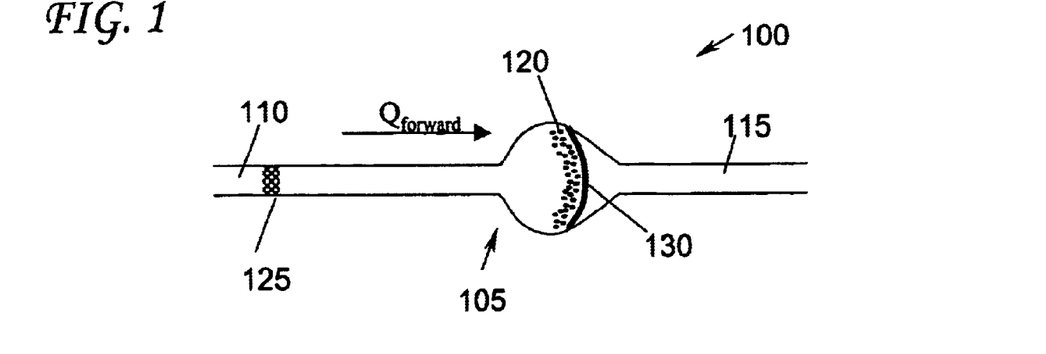
FIG. 1 is a schematic of a preferred embodiment for a basic concept of the check valve according to the invention having a net differential pressure generating a forward fluid flow rate, $Q_{forward}$.

FIG. 1 is a schematic of a preferred embodiment for a basic concept of a check valve 100 having a net differential pressure for forward fluid flow. Valve 100 includes a fluid chamber 105, an inlet 110, and an outlet 115. A plurality of particles 120 is disposed in chamber 105 and constrained to move between a first particle barrier 125 provided at inlet 110 and a second particle barrier 130 provided at outlet 115. It is noted that while various embodiments may be illustrated and described herein as using a plurality of particles, it is also within the scope of the present invention for a single particle to be used in a check valve according to the invention.

Barrier 125 and barrier 130 are designed to permit relatively unobstructed fluid flow in both directions while retaining the plurality of particles 120 between the barriers. Valve 100 works by providing a different hydrodynamic resistance to fluid flowing from the inlet to the outlet than it provides to fluid flowing from the outlet to the inlet. The differing hydrodynamic resistances are established by a combination of valve geometry near each barrier and the interaction of each barrier to an aggregation of the plurality of particles 120 at the barrier.

The fluid flow rate through a porous bed is stated in a simple form by Darcy's Law, $Q=k \Delta PA/L$, where Q is the volumetric fluid flow rate, $\Delta P$ is the differential pressure, A is the facial cross-sectional area of the porous media, L is the length of the porous bed and k is the Darcy parameter, or hydraulic conductivity, which takes into account fluid variables such as viscosity, and porous bed properties such as porosity, average pore diameter, tortuosity, etc. The relative hydrodynamic resistance (L/kA), for fluid flow in the forward and reverse directions is variable, according to the design of the check valve. The ratio of hydrodynamic resistances can range from slightly greater than unity to many orders of magnitude larger than unity. By varying the ratio of resistance incorporated into the valve design, valve 100 can be designed for operation in a continuum of modes that range from, but are not limited to, fluid metering devices at low resistance ratios to check valves at high resistance ratios.

There are many ways to make the conduits in combination with the barricades. Examples for making the conduit include, by way illustration, tubing extrusion, injection molding, microfabrication, etc. Other fabrication systems and methods could be used to create a conduit that has the desired shape and dimensionality. The method is chosen based upon the material to be used and the critical dimensions of the device.

Figure 2:
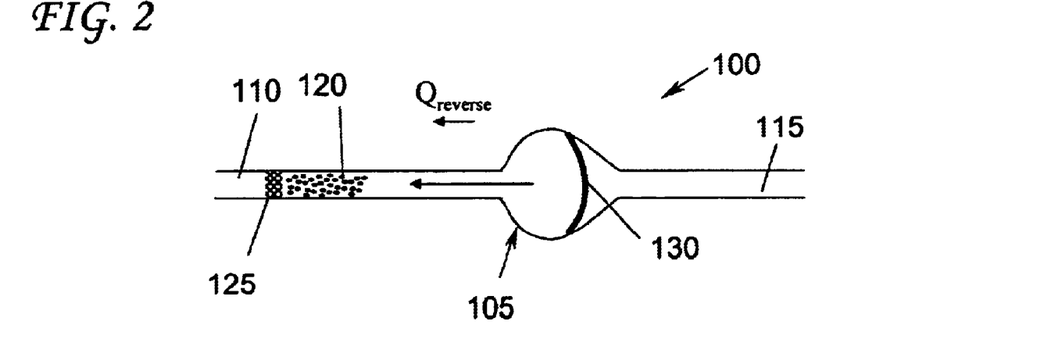
FIG. 2 is a preferred embodiment for a basic concept of the check valve having a net differential pressure generating a reverse fluid flow rate, $Q_{forward}$, according to the preferred invention.

In general, in response to a net positive pressure differential between inlet 110 and outlet 115, particles 120 will move within fluid chamber 105 and aggregate at second barrier 130 as shown in FIG. 1. Similarly, a net positive pressure differential between outlet 115 and inlet 110 moves particles 120 within fluid chamber 105 to aggregate a first barrier 125. FIG. 2 is a preferred embodiment for a basic concept of a check valve 100 having a net differential pressure for reverse fluid flow. Thus, FIGS. 1 and 2 together can be seen as different states of the same valve according to the invention.

The geometry of valve 100 is such that the aggregation of particles 120 (or of a single particle) at first barrier 125 creates a first hydrodynamic resistance that is substantially greater than a second hydrodynamic resistance created at second barrier 130. As shown in FIG. 1, particles 120 aggregating against second barrier 130 produce a relatively short bed of particles, with length L (as used in Darcy's Law above). The facial surface area of second barrier 130 is relatively large, making the hydrodynamic resistance relatively small. In contrast, in FIG. 2, the aggregation of particles 120 against first barrier 125 produces a relatively long bed of particles as the facial surface area of first barrier 125 is relatively small, making the hydrodynamic resistance relatively large. The performance of the valve as a check valve is improved as the ratio of the first hydrodynamic resistance to the second hydrodynamic resistance becomes large. In other words, it is desirable to have the first hydrodynamic resistance greater than the second hydrodynamic resistance, and preferably several orders of magnitude greater.

The net result is that valve 100 operates as a passive check valve that produces a directionally dependent fluid flow rate of fluid from inlet 110 to outlet 115. The predictability and repeatability of the creation of each hydrodynamic resistance at each barrier provide for a simple and versatile design that is easily constructed, operates simply, and has no significant material prerequisites or limitations.

Figure 3A:
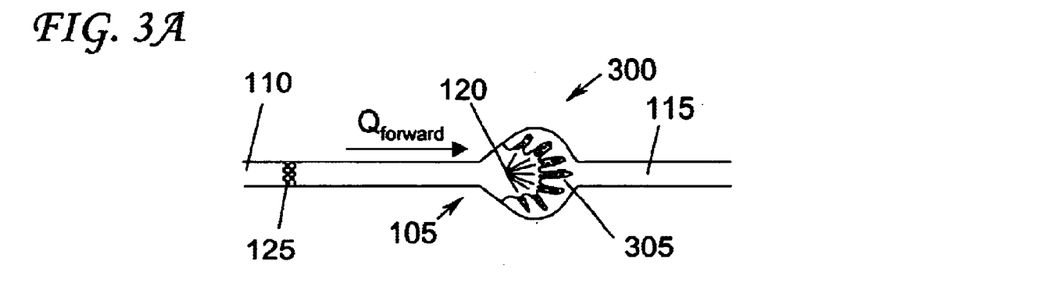
FIG. 3A and FIG. 3B are alternative preferred embodiments illustrating a microvalve structure and particle aggregation in forward fluid flow and reverse fluid flow configurations.
Figure 3B:
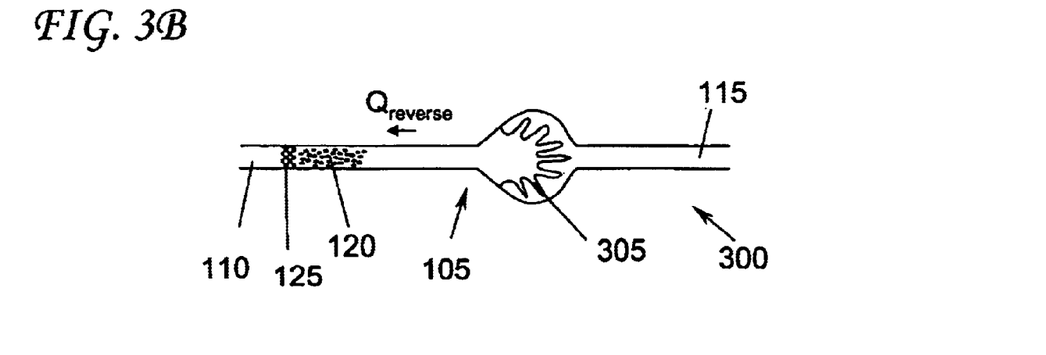

FIG. 3A and FIG. 3B are alternate preferred embodiments illustrating a valve structure 300 and particle 120 aggregations in forward fluid flow and reverse fluid flow configurations. Valve 300 includes a second barrier 305 that extends the facial cross-sectional area by changing the path of barrier 305. The 'folded' configuration of barrier 305 reduces the average length of the particle bed along barrier 305 reducing the hydrodynamic resistance in the forward direction.

Figure 4A:
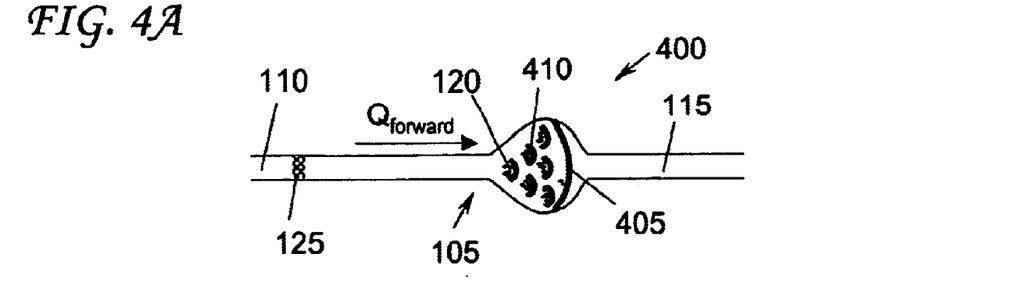
FIG. 4A and FIG. 4B are alternative preferred embodiments illustrating a microvalve structure and particle aggregation in forward fluid flow and reverse fluid flow configurations.
Figure 4B:
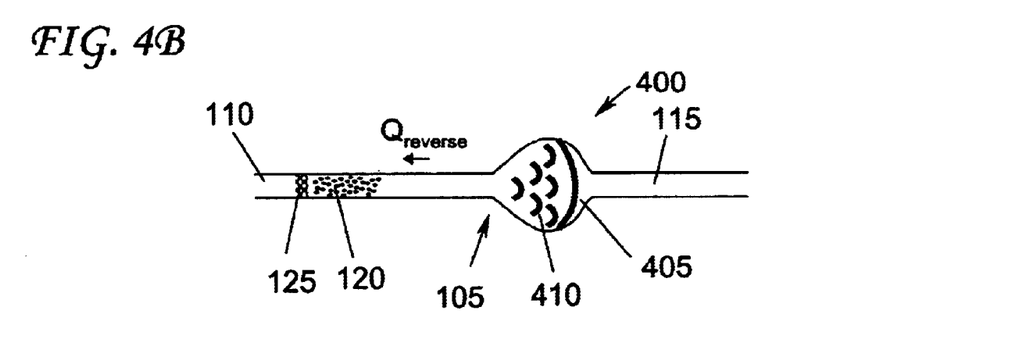

FIG. 4A and FIG. 4B are alternate preferred embodiments illustrating a valve structure 400 and particle 120 aggregation in forward fluid flow and reverse fluid flow configurations. Valve 400 includes a first barrier 125 and a second barrier 405 and one or more staggered trapping barriers 410 that extend the total facial barrier surface area in the forward direction to aggregate some particles 120 and to thereby reduce the average length of the particle bed along barrier 405 reducing the hydrodynamic resistance in the forward direction.

Figure 5A:
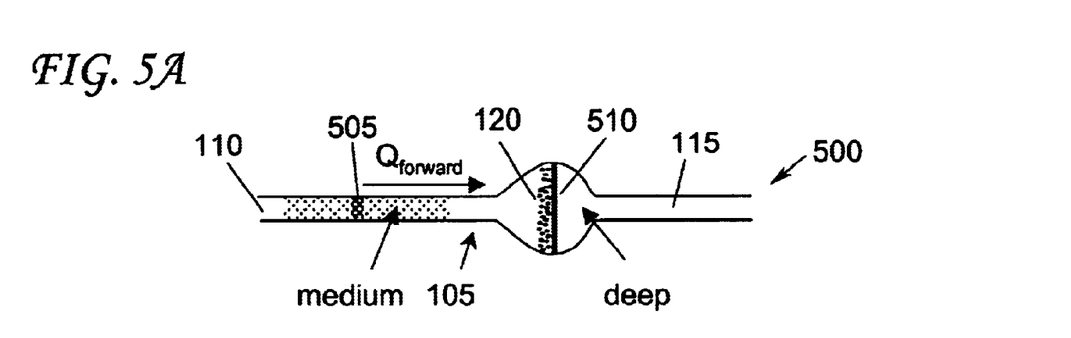
FIG. 5A and FIG. 5B are alternate preferred embodiments illustrating a mircovalve structure and particle aggregation in forward fluid flow and reverse fluid flow configurations.
Figure 5B:
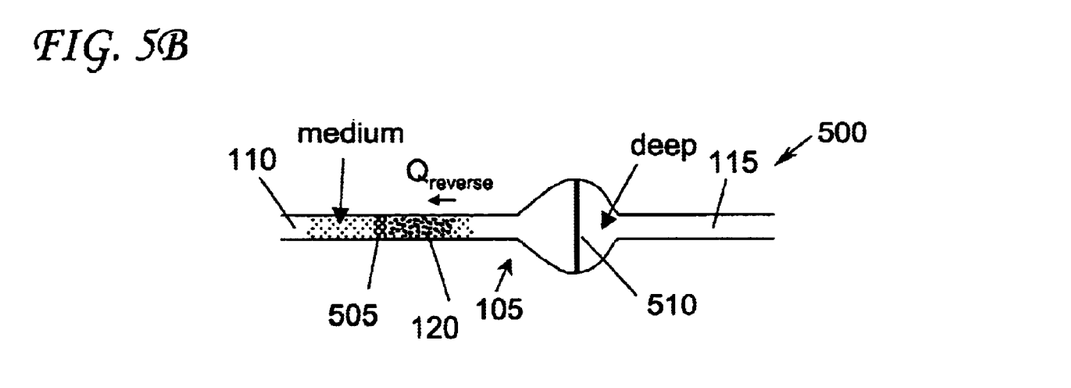

FIG. 5A and FIG. 5B are alternate preferred embodiments illustrating a valve structure 500 and particle 120 aggregations in forward fluid flow and reverse fluid flow configurations. Valve 500 includes a first barrier 505 and a second barrier 510 designed to permit relatively unobstructed fluid flow in both directions while retaining the plurality of particles 120 between the barriers. Additionally, valve 500 includes an alteration of the conduit adjacent to barrier 505 between the barriers 505 and 510 in a direction perpendicular (z-direction) to the view shown in FIG. 5A and FIG. 5B. In particular, the region is modified to further enhance the desired hydrodynamic resistance at the particular barrier. For example, the modified conduit structure 515 is constructed having a 'medium' depth, thus reducing the facial area and increasing the hydrodynamic resistance in the reverse fluid flow direction.

Figure 6A:
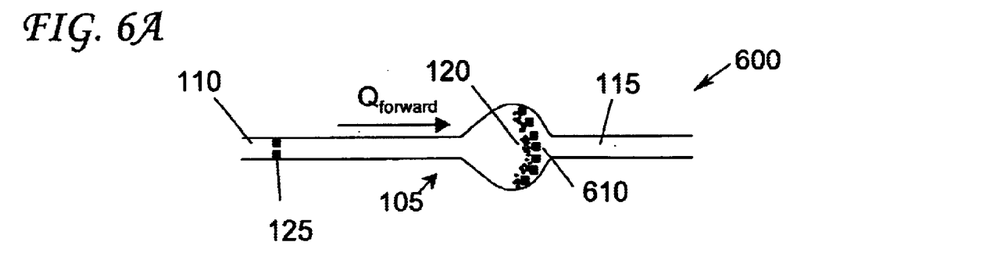
FIG. 6A and 6B are alternate preferred embodiments illustrating a microvalve structure and particle aggregation in forward fluid flow and reverse fluid flow configurations.
Figure 6B:
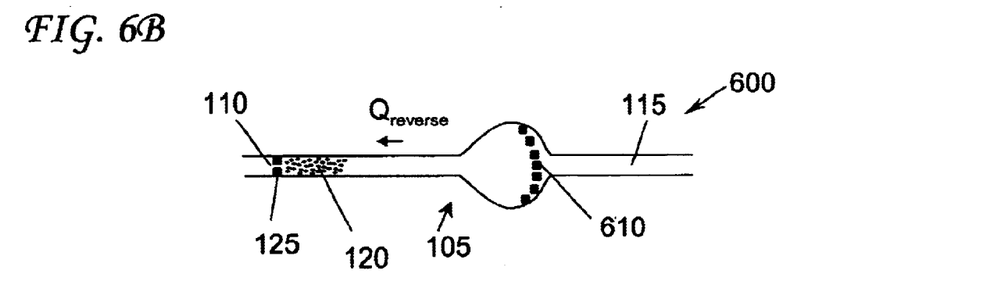

There are numerous of ways to fabricate barriers to contain particles(s) 120. Examples include, by way of illustration, constriction in a fluid conduit near an orifice to provide an opening that is smaller than a particle size, insertion of a mechanical porous flit having an average pore size smaller than the particles into the fluid conduit or photopolymerization of a polymeric porous barricade having a pore size smaller than the particle size into the fluid conduit. Other fabrication systems and methods could be used to create a barrier that does not substantially restrict the fluid while retaining the particles. One example of a microfabricated barrier is shown in FIG. 6A and FIG. 6B. This preferred embodiment illustrates a valve structure 600 and aggregated particle(s) 120 in forward fluid flow and reverse fluid flow configurations. Valve 600 has a first barrier 605 and a second barrier 610 fabricated for example by anisotropic etching to create a plurality of high aspect-ratio pillars 615 so that they are spaced together defining gaps smaller than the diameter of particle(s) 120. Anisotropic etching methods are well known and are commercially available for silicon, quartz and fused silica, enabling effective valves 600 to be fabricated in these materials. These structures can be transferred into alternate materials through transfer methods known to those skilled in the art, such as embossing, injection molding, etc. Please note that the barrier construction shown in FIG. 6A and FIG. 6B may alternatively be applied to the valves shown in FIG. 1–FIG. 5B in addition.

In the preferred embodiments illustrated in FIG. 1–FIG. 6B, forward fluid flow is increased by having barrier systems that may produce gaps between aggregated particles. If the number of particles is sufficient to fully cover a barrier (one or more particle layers), flow resistance is inversely proportional to the length of the filled conduit. When the number of particles is insufficient to completely cover a barrier (less than one layer), hydrodynamic resistance is reduced and flow rate is increased. Alternatively, similar control may be achieved by varying the number of trapped particles. Embodiments shown in FIGS. 3A, 3B, 4A and 4B are examples that could lend themselves to this type of control.

Further, to achieve a high 'check-ratio' of the preferred embodiment, using particle(s) 120 having a relatively small diameter is preferable to having a relatively large diameter. Typical particle diameters that are used in these systems range from 0.1 $\mu$m to 100 $\mu$m. The smaller diameter particles reduce pore diameter between particles and produces a higher flow resistance per volume occupied. For applications having low flow rate and high-pressure, it is particularly important to reduce the pore diameter.

As described in the invention, particles used in the check valve can take varied forms including, but not limited to, beads, powders, fumed ceramics, fibers, floc, spheres, microcrystals, rods, other structural material or mixtures thereof. The particles used in the system can be solid, porous, hollow, etc. They can be made of any material that is compatible with the operation of the device and can be formed into appropriately sized elements. Performance of the check valve depends upon the capacity of the selected material to offer a hydrodynamic resistance and its freedom to move in the check valve during operation. Suitable materials include, but are not limited to, ceramics, polymers, oxides, nitrides, carbides, semiconductors, pure metallic or non-metallic elements, metal alloys, etc. Examples of these materials may include, but are not limited to, silica ($SiO_2$), titania ($TiO_2$), alumina ($AlO_x$), zirconia ($ZrO_x$), diamond, gallium arsenide, mica, glass, PTFE, PMMA, latex, styrene, or other polymeric materials. A smaller set of particles will be acceptable for use in the valves in more restrictive applications. For example, use of the valves in medical devices might limit particle material selection to a subset of biocompatible materials.

An additional factor that contributes to and enhances the performance of the valves of the preferred embodiments is use of particles 120 that are elastic. One example of an elastic particle is a polymer sphere though other suitable elastic materials and geometries may be used. Elastic spheres deform under pressure, thus reducing the effective pore size between particles. The effect especially contributes in the reverse flow direction and may be influenced by conduit design.

An additional utility of the valve configurations described is achieved when particles that interact chemically with the surrounding fluid are used. Some particles possess, or can be modified to possess, surface moieties that attract or bind specific fluid analytes to the particle. For example, ion exchange resins are commonly used in fluidic systems for removing organic and/or inorganic compounds, desalting, dechlorination, demineralization, pH regulation, protein purification, antibody isolation, peptide fractionation, etc. The use of similar particles in the present invention allows the manufacture of valves in which the fluid is preferentially chemically modified for fluid flow in a specified direction.

On the microscopic scale, the degree of interaction between the charged particle surface and species in the fluid is essentially fixed. However, the interaction time between the fluid and particle surface is dependent upon the direction of fluid flow in the particle-based valve. For example, for a fixed-pressure source and flow in the forward direction (FIG. 1), the residence time would be relatively short as the fluid flow rate is relatively high and the length of the particle bed is relatively short. In this case, very limited fluid modification would occur. In the reverse direction (FIG. 2), the residence time would be relatively long as the fluid flow rate is decreased and the length of the particle bed is increased. The extended interaction between the fluid and particles increases ion exchange between the particle and the fluid. In this embodiment the valve would, for example, function to modify the pH of the fluid, depending on the direction of flow.

Another important design characteristic of the valves of the present invention is the valve response time. The response time is directly influenced by the time it takes the particles to aggregate against the barriers, and as such the length of the conduit is directly implicated. To reduce the response time, size of the valve should be as small as possible while achieving other necessary design objectives. The use of smaller particles is preferred for faster response times by virtue of the lower volume occupied combined with their capability to offer higher check ratios in preferred embodiments of the check valve. The embodiments of FIGS. 3A, 3B, 4A and 4B are designs that may be fabricated to have the shortest conduit length. A possible limitation on the size of the device may be the method by which particles 120 are introduced in fluid chamber 105.

Figure 7:
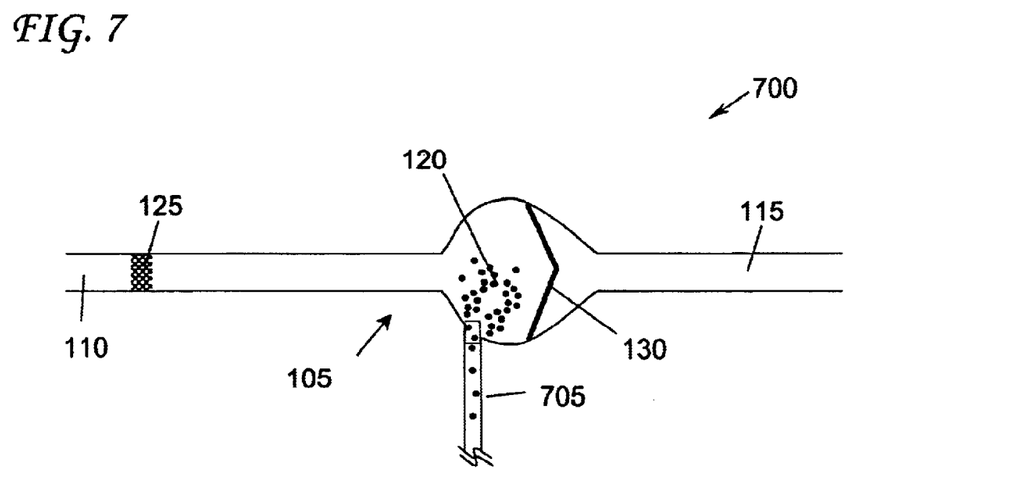
FIG. 7 is a preferred embodiment for introducing particles into the fluid chamber of a microvalve.

FIG. 7 is a preferred embodiment for introducing particles into fluid chamber 105 of a valve 700. Valve 700 is initially fabricated with a temporary side fill port 705 that is used to direct particles 120 directly into chamber 105. After filling, fill port 705 is sealed. It is important that the design, fabrication and sealing of fill port 705 do not interfere with operation of valve 700. The volume and positioning of fill port 705 is preferably such that it inhibits or prevents particles from being trapped or contained within, thereby decreasing the operational efficiency. One preferred embodiment will be to minimize the volume of the fill port 705.

Figure 8A:
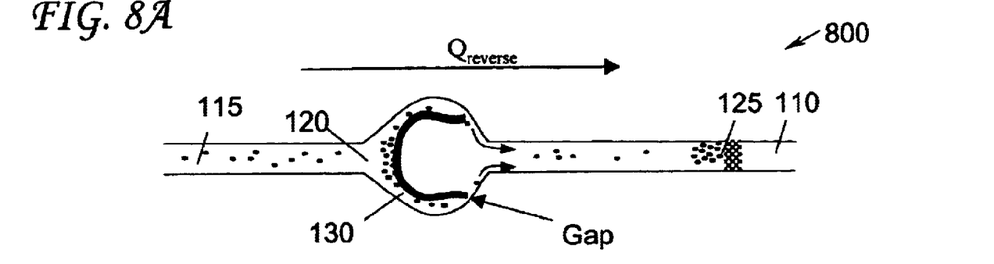
FIG. 8A and 8B are preferred embodiments for introducing and retaining particles into the fluid chamber of a microvalve.
Figure 8B:
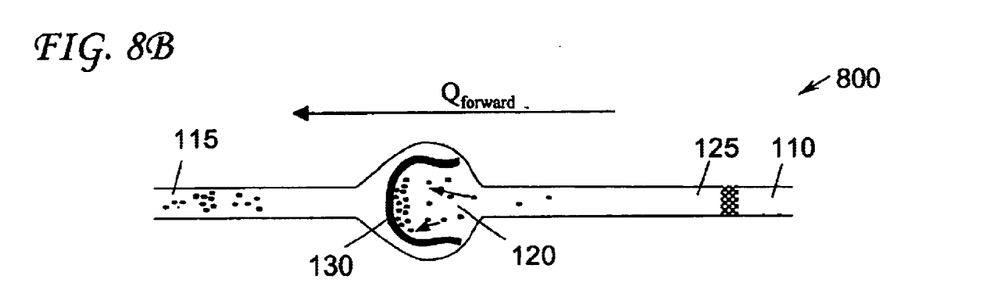

FIG. 8A and 8B are alternate preferred embodiments for introducing and retaining particles into fluid chamber 105 of a valve 800. The construction of valve 800 permits particles 120 to be introduced into fluid chamber 105 without a fill port as shown in FIG. 7. Valve 800 is constructed so that particles may be introduced from outlet 115 and directed towards inlet 110. Second barrier 130 is constructed such that particles 120 may pass one-way from outlet 115 into fluid chamber 105. Once a sufficient number of particles 120 are injected into chamber 105, fluid flow is reversed to purge particles from the region between second barrier 130 and outlet 115. Thereafter, microvalve 800 operates as described above.

An alternative embodiment uses elastically deformable particles (e.g., microspheres) that are loaded into fluid chamber 105 from the outlet by injecting them under high pressure. The spheres deform sufficiently under the high pressure to pass through second barrier 130, but cannot pass back through when flow direction is reversed and the microvalve operates under standard conditions. Other systems that use selectively permeable barriers or that fabricate or introduce barriers in place after particles are loaded in the fluid chamber may alternatively be suitable depending upon design considerations.

An alternative embodiment uses expandable particles 120 that are loaded into fluid chamber 105 from either the inlet 110 or outlet 115. In their initial state, particles 120 would be small enough to pass by either or both first barrier 125 and second barrier 130. When the particles are within fluid chamber 105, they may then expand to a size that will not allow particles 120 to pass first barrier 125 or second barrier 130. The expansion of particles can be induced in a variety of ways using methods known to those skilled in the art, including but not limited to non-reversible thermal expansion. The use of a single particle in this embodiment offers the opportunity to reduce the response time of the check valve significantly by reducing the physical dimensions of the features within the check valve such that they are slightly larger than those of the single particle.

Figure 9:
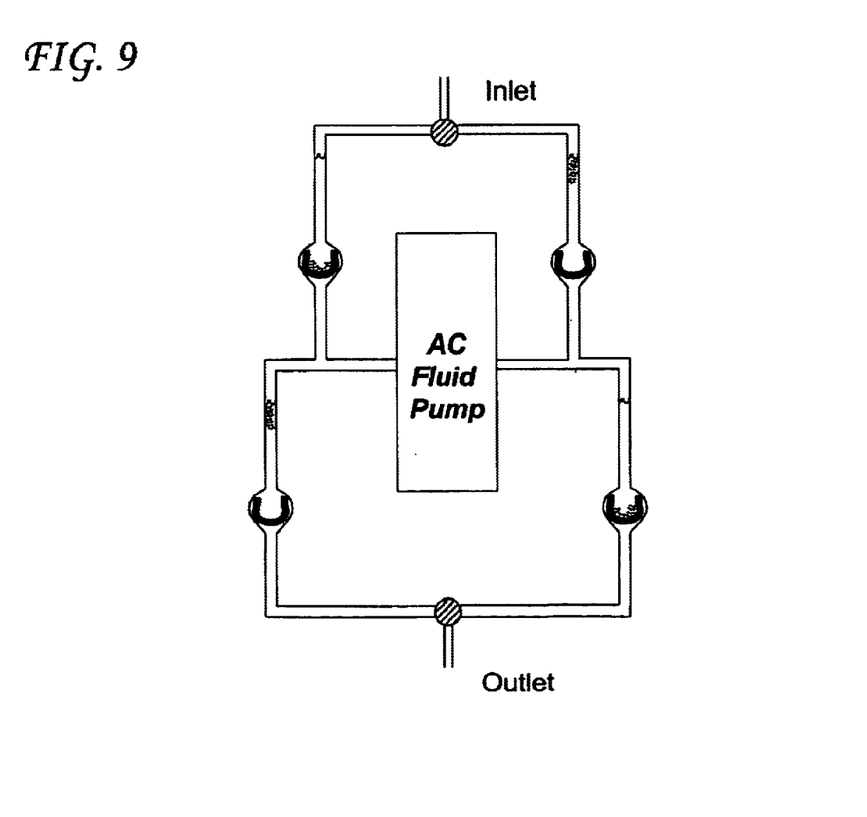
FIG. 9 is a fluid flow full rectifier for oscillating source pressures using micro scale check valves.

It should be obvious to those skilled in the art that the aforementioned valve embodiments could be used alone or in combination to perform a variety of tasks, such as, but not limited to, sample injection into a chromatographic column, rectifying unsteady or oscillatory fluid flow, bi-directional flow-metering, etc. For example, FIG. 9 is a fluid flow full rectifier 900 for oscillating source pressures using four microscale check valves 905. Rectifier 900 takes output from a fluid pump 910 that is designed to move fluid in an oscillatory-fashion (i.e., sloshing fluid back and forth) and convert it into unidirectional flow. By using two microscale check valves appropriately connected, a half-rectifier could also be constructed to provide no fluid flow during a 'negative' direction.

Microfabrication methods are directly applicable to the construction of the preferred microvalve embodiments of the present invention. These micro-format methods include, for example, lithography/etching, laser machining, embossing, injection, imprinting, etc. At a high level of generality, the preferred manufacturing method includes patterning appropriate conduits in one or both of a pair of substrates using a micro-format method followed by bonding the two substrates together using techniques appropriate for the substrates. For example, for polymeric substrates, this can include lamination, ultrasonic welding, and thermal welding. For glass, silica, silicon, bonding can be achieved, for example, by direct thermal bonding, or through an intermediary adhesion-layer method. Some glass/silicon combinations may, for example, use anodic bonding.

As an example, one can consider a micro check valve fabricated in fused silica. Standard lithographic masking, patterning, wet etch and thermal bonding processes are used. The approximately semicircular conduits are etched to a desired depth, 25 µm for this example, and the depth of the channel over the barrier is smaller than the particle size (~3 µm for this example). The length of the barrier is adjustable but preferable short (10 µm, for this example). For a wafer that is isotropically etched 25 µm deep (with a 10 µm mask linewidth) the width at the top of the inlet conduit and the outlet conduit is 60 µm. The size of the chamber is preferably as small as possible to decrease response times but it can be on the order of mm's in width. For this example, the width is 1 mm. If this example system uses approximately 6000 silica particles that are 5.5 µm in diameter, one achieves approximately a 20:1 check ratio.

The above-described arrangements of apparatus and methods are merely illustrative of applications of the principles of this invention and many other embodiments and modifications may be made without departing from the spirit and scope of the invention as defined in the claims. For example, while the description of the preferred embodiment uses the term fluid as the preferred embodiment is directed to liquid systems, the present invention is not limited and fluid includes gaseous and other non-liquid matter states as well known in the art.

What is claimed is:

1. A check valve for a fluidic system, comprising:

a fluidic conduit having an inlet with a first particle barrier, an outlet with a second panicle barrier and a fluid chamber between said inlet and said outlet; and a plurality of elastically deformable particles disposed in said fluid chamber, said plurality of particles aggregating at said first particle barrier to form a first hydrodynamic resistance when a first fluid pressure at said inlet is less than a second fluid pressure at said outlet, said plurality of particles aggregating at said second particle barrier to form a second hydrodynamic resistance when said first fluid pressure is greater than said second fluid pressure.

2. A check valve for a fluidic system, comprising:

a fluidic conduit having an inlet with a first particle barrier, an outlet with a second particle barrier and a fluid chamber between said inlet and said outlet; and a plurality of polymeric particles having a diameter of between 0.1 µm and 100 µm disposed in said fluid chamber, said plurality of particles aggregating at said first particle barrier to form a first hydrodynamic resistance when a first fluid pressure at said inlet is less than a second fluid pressure at said outlet, said plurality of particles aggregating at said second particle barrier to form a second hydrodynamic resistance when said first fluid pressure is greater than said second fluid pressure.

3. A check valve for a fluidic system, comprising:

a fluidic conduit having an inlet with a first particle barrier, an outlet with a second particle barrier and a fluid chamber between said inlet and said outlet; and a plurality of particles having a charged surface disposed in said fluid chamber, said plurality of particles aggregating at said first particle barrier to form a first hydrodynamic resistance when a first fluid pressure at said inlet is less than a second fluid pressure at said outlet, said plurality of particles aggregating at said second particle barrier to form a second hydrodynamic resistance when said first fluid pressure is greater than said second fluid pressure.

4. A check valve for a fluidic system, comprising:

a fluidic conduit having an inlet with a first particle barrier, an outlet with a second particle barrier and a fluid chamber between said inlet and said outlet; and a plurality of particles having ion-exchange properties disposed in said fluid chamber, said plurality of particles aggregating at said first particle barrier to form a first hydrodynamic resistance when a first fluid pressure at said inlet is less than a second fluid pressure at said outlet, said plurality of particles aggregating at said second particle barrier to form a second hydrodynamic resistance when said first fluid pressure is greater than said second fluid pressure.

5. A check valve for a microfluidic system, comprising:

a fluidic conduit having an inlet with a first particle barrier, an outlet with a second particle barrier and a fluid chamber between said inlet and outlet;

a plurality of microscale particles having a diameter of between 0.1 µm and 100 µm disposed in said fluid chamber; and means, disposed in said fluid chamber, for aggregating at said first particle barrier to form a first hydrodynamic resistance when a first fluid pressure at said inlet is less than a second fluid pressure at said outlet, said plurality of particles aggregating at said second particle barrier to form a second hydrodynamic resistance when said first fluid pressure is greater than said second fluid pressure, and said first hydrodynamic resistance is greater than said second hydrodynamic resistance.

6. A method of operating a check valve in a microfluidic system, comprising the steps of:

aggregating a plurality of microscale particles having a diameter of between 0.1 µm and 100 µm disposed in a fluidic conduit at a first particle barrier at an inlet to form a first hydrodynamic resistance in response to a positive pressure differential between an outlet of said fluidic conduit and said inlet to substantially inhibit fluid flow out of said conduit through said inlet; and aggregating plurality of particles at a second particle barrier at said outlet to form a second hydrodynamic resistance in response to a positive pressure differential between said inlet and said outlet to substantially not interfere with fluid flow out of said conduit through said outlet.

7. A method of operating a check valve in a microfluidic system, comprising the step of:

aggregating a plurality of microscale particles having a diameter of between 0.1 µm and 100 µm disposed in a fluidic conduit at a particle barrier at an inlet to form a hydrodynamic resistance in response to a positive pressure differential between an outlet of said conduit and said inlet to substantially inhibit fluid flow out of said conduit through said inlet.

8. A method of operating a check valve in a microfluidic system, comprising the step of:

aggregating plurality of microscale particles having a diameter of between 0.1 µm and 100 µm disposed in a fluidic conduit at a particle barrier at an outlet to form a hydrodynamic resistance in response to a positive pressure differential between an inlet and said outlet to substantially not interfere with fluid flow out of said outlet.

9. A check valve for a fluidic system, comprising:

a fluidic conduit having an inlet with a first particle barrier, an outlet with a second folded particle barrier and a fluid chamber between said inlet and said outlet; and a plurality of particles disposed in said fluid chamber, said plurality of particles aggregating at said first particle barrier to form a first hydrodynamic resistance when a first fluid pressure at said inlet is less than a second fluid pressure at said outlet, said plurality of particles aggregating at said second folded particle barrier to form a second hydrodynamic resistance when said first fluid pressure is greater than said second fluid pressure.

10. A check valve for a fluidic system, comprising:

a fluidic conduit having an inlet with a first particle barrier, an outlet with a second particle barrier, one or more trapping barriers, and a fluid chamber between said inlet and said outlet; and a plurality of particles disposed in said fluid chamber, said plurality of particles aggregating at said first particle barrier to form a first hydrodynamic resistance when a first fluid pressure at said inlet is less than a second fluid pressure at said outlet, some of said plurality of particles aggregating at said second particle barrier, and some of said plurality of particles aggregating at one or more trapping barriers to form a second hydrodynamic resistance when said first fluid pressure is greater than said second fluid pressure.

11. A check valve for a fluidic system, comprising:

a fluidic conduit having an inlet with a first particle barrier, an outlet with a second particle barrier and a fluid chamber between said inlet and said outlet; and a plurality of particles disposed in said fluid chamber, wherein the second barrier is constructed such that said plurality of particles passes one-way from the outlet, by the second barrier, and into the fluid chamber, said plurality of particles aggregating at said first particle barrier to form a fast hydrodynamic resistance when a first fluid pressure at said inlet is less than a second fluid pressure at said outlet, said plurality of particles aggregating at said second particle barrier to form a second hydrodynamic resistance when said fast fluid pressure is greater than said second fluid pressure.

12. A check valve for a fluidic system, comprising:

a fluidic conduit having an inlet with a first particle barrier, an outlet with a second particle barrier and a fluid chamber between said inlet and said outlet; and a plurality of expandable particles having an initial state and an expanded state, wherein said plurality of particles are small enough in the initial state to pass by one or both of the first and second particle barriers, and large enough in the expanded state when disposed in said fluid chamber to not pass through the first and second particle barriers, said plurality of expanded particles aggregating at said first particle barrier to form a first hydrodynamic resistance when a first fluid pressure at said inlet is less than a second fluid pressure at said outlet, said plurality of expanded particles aggregating at said second particle barrier to form a second hydrodynamic resistance when said first fluid pressure is greater than said second fluid pressure.

13. A check valve for a microfluidic system, comprising:

a fluidic conduit having an inlet with a first particle barrier, an outlet with a second particle barrier and a fluid chamber between said inlet and said outlet; and a plurality of microscale particles having a diameter of between 0.1 µm and 100 µm disposed in said fluid chamber, said plurality of particles aggregating at said first particle barrier to form a first hydrodynamic resistance when a first fluid pressure at said inlet is less than a second fluid pressure at said outlet, said plurality of particles aggregating at said second particle barrier to form a second hydrodynamic resistance when said first fluid pressure is greater than said second fluid pressure.

14. The check valve of claim 13 wherein said first hydrodynamic resistance is greater than said second hydrodynamic resistance and wherein said first hydrodynamic resistance is sufficient to substantially impede fluid flow out of said inlet.

15. The check valve of claim 14 wherein said second hydrodynamic resistance does not substantially impede fluid flow out of said outlet.

16. The check valve of claim 15 wherein said first hydrodynamic resistance is much greater than said second hydrodynamic resistance.

17. The check valve of claim 13 wherein said hydrodynamic resistances are achieved by a combination of physical geometric relationships between a facial cross-section of said fluidic conduit proximate each of said particle barriers, an average diameter of said plurality of particles, length of said fluidic conduit proximate each of said particle barriers, and number of said plurality of particles in said fluid chamber.

18. The check valve of claim 17 wherein said facial cross-section proximate said first particle barrier is substantially smaller than said facial cross-section proximate said second particle barrier.

19. The check valve of claim 13 wherein said particle barriers are porous structures having a pore size less than an average diameter of said plurality of particles.

20. The check valve of claim 13 wherein said particle barriers are porous constricting said fluidic conduit to permit substantially unimpeded fluid flow while retaining said plurality of particles in said fluid chamber.

21. The check valve of claim 13 wherein said fluid chamber includes an enlarged conduit and said second particle barrier is disposed outside said fluid chamber.

22. The check valve of claim 21 wherein said first particle barrier presents a lesser surface area to a first fluid stream from said outlet to said inlet than said second particle barrier presents to a second fluid stream from said inlet to said outlet.

23. The check valve of claim 21 wherein said hydrodynamic resistances are achieved by a combination of physical geometric relationships between a facial cross-section of said fluidic conduit, an average diameter of said plurality of particles, the number of said plurality of particles and a length of said fluidic conduit proximate each of said barriers.

24. The check valve of claim 23 wherein said first hydrodynamic resistance is greater than said second hydrodynamic resistance and wherein said first hydrodynamic resistance is sufficient to substantially impede fluid flow out of said inlet.

25. The check valve of claim 24 wherein said second hydrodynamic resistance does not substantially impede fluid flow out of said outlet.

* * * * *